United States Patent
Shellshear et al.

(10) Patent No.: US 8,619,135 B2
(45) Date of Patent: Dec. 31, 2013

(54) DETECTION OF ABNORMAL BEHAVIOUR IN VIDEO OBJECTS

(75) Inventors: Andrew John Shellshear, North Ryde (AU); David Grant McLeish, Northmead (AU)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 12/953,802

(22) Filed: Nov. 24, 2010

(65) Prior Publication Data
US 2011/0128374 A1 Jun. 2, 2011

(30) Foreign Application Priority Data
Nov. 30, 2009 (AU) ................................ 2009243442

(51) Int. Cl.
*H04N 7/18* (2006.01)
*G06K 9/00* (2006.01)

(52) U.S. Cl.
USPC .......................................... 348/135; 382/103

(58) Field of Classification Search
USPC .......................................... 348/135; 382/103
See application file for complete search history.

(56) References Cited

U.S. PATENT DOCUMENTS

| 7,446,784 | B2 | 11/2008 | Crew et al. | |
|---|---|---|---|---|
| 2006/0109341 | A1 | 5/2006 | Evans | 348/14.08 |
| 2009/0016599 | A1 | 1/2009 | Eaton et al. | |
| 2009/0077129 | A1 | 3/2009 | Blose | 707/104.1 |
| 2009/0210373 | A1 | 8/2009 | Yu et al. | |
| 2009/0279738 | A1* | 11/2009 | Sasaki | 382/103 |
| 2011/0064267 | A1* | 3/2011 | Cobb et al. | 382/103 |

FOREIGN PATENT DOCUMENTS

| CN | 101571914 A | 11/2009 |
|---|---|---|
| WO | 2008098188 A2 | 8/2008 |
| WO | 2009152766 A1 | 12/2009 |

OTHER PUBLICATIONS

Pierre-Marc Jodoin et al., "Behavior subtraction, a new tool for video analytics," SPIE Newsroom, Apr. 2, 2009, http://spie.org/x34279.xml?ArticleID=x34279,—3 pages.
Office Action which issued on Jan. 31, 2012, in counterpart Australian application No. 2009243442.
Office Action issued on Apr. 19, 2013, in counterpart Australian application No. 2009243442.

* cited by examiner

*Primary Examiner* — Richard Torrente
(74) *Attorney, Agent, or Firm* — Fitzpatrick, Cella, Harper & Scinto

(57) ABSTRACT

A method, system, and computer program product for classifying a behavior of a detected object in a video frame, wherein the video frame includes a plurality of blocks and the detected object is associated with a subset of the plurality of blocks. The method includes the step of associating a behavior model with each of the plurality of blocks, wherein each behavior model includes a set of behavior modes each having a set of parameters. The method further includes the steps, for each block in the video frame associated with the detected object, of: (i) determining a set of behavior statistics associated with the detected object, based on the detected object and the set of parameters; and (ii) comparing the determined set of behavior statistics with the set of parameters of each behavior mode in the set of behavior modes associated with that block to determine an abnormality score. The method also includes the step of classifying the behavior of the detected object based on the abnormality scores associated with the subset of the plurality of blocks associated with the detected object.

10 Claims, 13 Drawing Sheets

DETECTION OF ABNORMAL BEHAVIOUR IN VIDEO OBJECTS

RELATED APPLICATION

This application claims the right of priority under 35 U.S.C. §119 based on Australian Patent Application No. 2009243442 entitled "Detection of abnormal behaviour in video objects", filed on 30 Nov. 2009 in the name of Canon Kabushiki Kaisha, the entire contents of which are incorporated herein by reference as if fully set forth herein.

TECHNICAL FIELD

The present disclosure relates to video analytics and, in particular, to the automatic detection of unusual behaviour in video footage.

BACKGROUND

A commonly desired feature of video surveillance cameras is the ability to detect when something unusual happens and then issue an appropriate report or alarm. Historically, detection of unusual events in video surveillance has been performed by is having security professionals watching video footage of a scene on one or more video display monitors. More recently, the field of video analytics has allowed computers to perform automatic detection of objects in video. Security professionals can use these detected video objects to create rules that trigger alarms or events when certain criteria are met. For example, an object of a certain size entering a predefined area of a scene may trigger an alarm. These rules are used for a variety of purposes, such as intrusion detection, abandoned object detection, removed object detection, tailgating detection, speeding detection, and falling over detection.

While such rules are useful in a scene with requirements that are well understood and easily definable, sometimes a scene is more complicated and it is difficult to set up accurate rules, or the security professional just wants to be told when something unusual happens.

There are several existing systems for detecting abnormal events. One method uses motion detection to estimate velocity at each point of a scene captured in a video sequence, without associating that velocity with any particular object, in order to build up an average "flow map" of the scene over a period of time. If a current video sequence has velocities that are sufficiently different from the flow map, the method triggers an abnormal behaviour event. This method is limited to velocity vectors, however, because this method does not perform true object detection. This method cannot detect objects of unusual size, or objects in unusual positions in the scene, unless these objects are also accompanied by sufficiently unusual velocity vectors.

Another method uses background subtraction to build up statistics for a scene over time relating to how often a portion of the scene is part of the background. At a given time, a current foreground mask can be compared with an average background mask to detect whether the current frame has objects in abnormal positions. This method is limited to detecting abnormal positions of objects. This method is not able to detect an object moving at an unusual speed, or an object of an unusual size, unless that object was also in an unusual position.

A third method uses histograms to accumulate position and motion information about a scene, using point-feature extraction to obtain object and tracking data. Abnormal events are detected by comparing current positions and motions of objects with the histograms. This method has a disadvantage in that because input parameters are broken up into histogram bins, it is memory intensive to add extra parameters, each parameter contributing an additional dimension to the storage array. In addition, because this method uses point-feature extraction, it has no concept of object size.

Thus, a need exists to provide an improved method for classifying a behaviour of a detected video object in a video frame.

SUMMARY

It is an object of the present invention to overcome substantially, or at least ameliorate, one or more disadvantages of existing arrangements.

According to a first aspect of the present disclosure, there is provided a method of classifying a behaviour of a detected object in a video frame, wherein the video frame includes a plurality of blocks and the detected object is associated with a subset of the plurality of blocks and a set of parameters. The method includes the step of associating a behaviour model with each of the plurality of blocks, wherein each behaviour model includes a set of behaviour modes. The method then performs the steps, for each block in the video frame associated with the detected object, of: (i) determining a set of behaviour statistics associated with the detected object, based on the detected object and the set of parameters; and (ii) comparing the determined set of behaviour statistics with each behaviour mode in the set of behaviour modes associated with that block to determine an abnormality measure associated with the block. The method then classifies the behaviour of the detected object based on the abnormality measures associated with the subset of the plurality of blocks associated with the detected object.

According to a second aspect of the present disclosure, there is provided a camera system for classifying a behaviour of a detected object in a video frame. The camera system includes: a lens system for focussing on a scene including the detected object; a camera module coupled to the first lens system to store the video frame; an object detection module for detecting an object in the video frame, wherein the video frame comprises a plurality of blocks and the detected object is associated with a subset of the plurality of blocks; an object tracking module for associating a set of parameters with the detected object; a storage device for storing a computer program; and a processor for executing the program. The program includes: code for associating a behaviour model with each of the plurality of blocks, wherein each behaviour model includes a set of behaviour modes; code for performing the steps, for each block in the video frame associated with the detected object, of: (i) determining a set of behaviour statistics associated with the detected object, based on the detected object and the set of parameters; and (ii) comparing the determined set of behaviour statistics with each behaviour mode in the set of behaviour modes associated with that block to determine an abnormality measure associated with the block; and code for classifying the behaviour of the detected object based on the abnormality measures associated with the subset of the plurality of blocks associated with the detected object.

According to a third aspect of the present disclosure, there is provided a method of detecting an abnormal behaviour of a detected object in a video frame, wherein the video frame includes a plurality of blocks and the detected object is associated with a subset of the plurality of blocks. The method includes the steps of: associating at least one block in the subset of the plurality of blocks with a behaviour mode;

determining a set of behaviour statistics associated with the detected object, for each block in the subset of the plurality of blocks; comparing, for each block in the subset of the plurality of blocks, the determined set of behaviour statistics associated with the detected object for that block with the behaviour mode associated with that block; and detecting the abnormal behaviour of the detected object based on the comparing step.

According to a fourth aspect of the present disclosure, there is provided a method of displaying a set of behaviour statistics associated with a detected object in a video frame, wherein the video frame includes a plurality of blocks. The method includes the steps of: determining the set of behaviour statistics associated with the detected object, the detected object being associated with a subset of the plurality of blocks; and displaying the behaviour statistics of the detected object in the plurality of blocks associated with the detected object.

According to a fifth aspect of the present disclosure, there is provided a method of classifying a behaviour of a detected object in a video frame, wherein the video frame includes a plurality of blocks. The method includes the steps of: associating at least one of the plurality of blocks with a first behaviour mode; determining a behaviour statistics of the detected object, the detected object associated with a portion of the plurality of blocks; comparing the determined behaviour statistics with a second behaviour mode; calculating a difference between the first behaviour mode and the second behaviour mode; merging the first behaviour mode and the second behaviour mode to produce a merged behaviour mode, based on the calculation; comparing the determined behaviour statistics with the merged behaviour mode of the associated portion of the plurality of blocks; and classifying the behaviour of the detected object based on the comparing step.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the aforementioned methods.

Other aspects of the invention are also disclosed.

BRIEF DESCRIPTION OF THE DRAWINGS

One or more embodiments of the invention will now be described with reference to the following drawings, in which.

DETAILED DESCRIPTION

Figure 1:
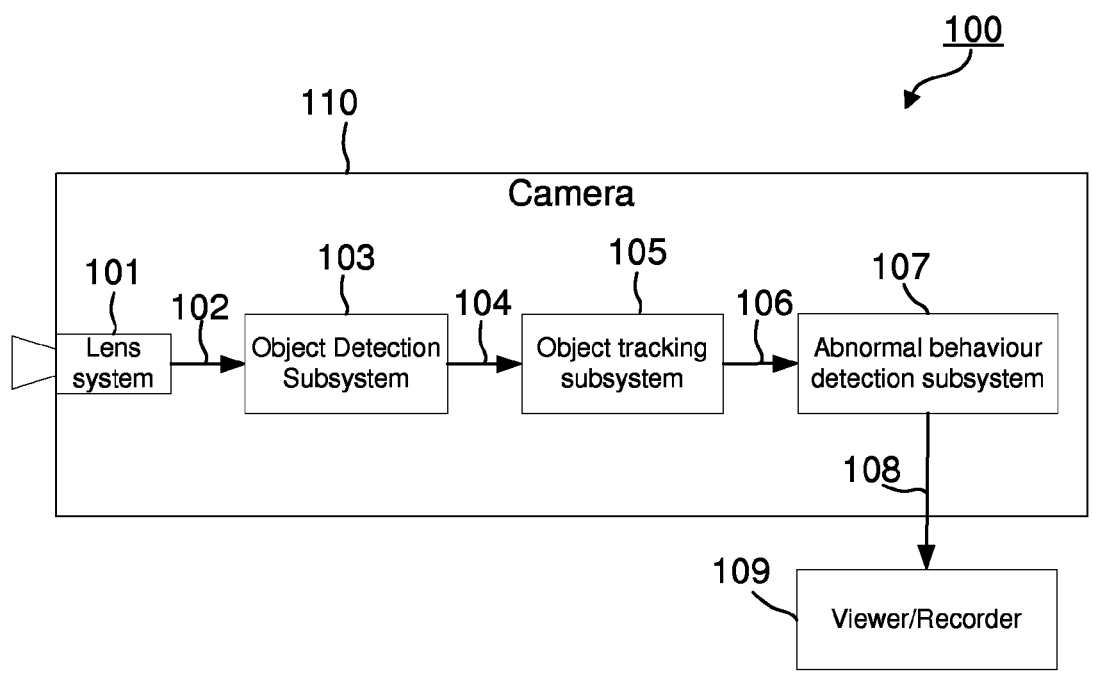
FIG. 1 is a schematic block diagram of a data processing architecture according to an embodiment of the present disclosure.

Where reference is made in any one or more of the accompanying drawings to steps and/or features that have the same reference numerals, those steps and/or features have for the purposes of this description the same function(s) or operation(s), unless the contrary intention appears.

Disclosed herein are a system and a method for classifying a behaviour of a detected object in a video frame. Through classifying the behaviour of a detected object, the system and method of the present disclosure facilitate detection of abnormal behaviour of a detected object in video footage. The method utilises objects detected in a scene, along with tracking data associated with each detected object, to accumulate, over a period of time, a behaviour model of objects in the scene. The behaviour model breaks the scene up into small blocks, and accumulates information separately for each block, wherein the information represents what constitutes typical behaviour for each respective block. For each block, the method accumulates statistics about a set of parameters associated with each detected object. The parameters associated with a detected object may include, for example, but are not limited to, speed, object size, and stability. The method uses the concept of "modes" to allow a set of many object parameters to contribute to the behaviour model, and by allowing similar groups of behaviours to form clusters. Each cluster of similar groups of behaviours constitutes a behaviour mode.

Each mode represents a statistical group of samples, with a mean and standard deviation. The superposition of the modes provides a meaningful approximation of the raw contributing data. An advantage of the mode-based behaviour model is that it can use a large number of parameters efficiently without having to over-simplify the statistics. Bin-based approaches, in which separate counting bins are created for a fixed range of each combination of parameters, require an extra array dimension for each additional parameter, which requires a great deal more memory and, in practice, limits the number of parameters that can be used.

Terms

For the purposes of this description, a video camera looking at a scene is considered to produce a series of separable video frames at a constant frame-rate. The series of separable video frames may be referred to as a frame sequence. Each video frame in a frame sequence has the same dimensions in pixels as each other video frame in the same frame sequence. Each video frame can also be divided into a set of blocks, where each block comprises a fixed array of pixels. In one example, the video camera produces frames with a resolution of 640 by 480, and has blocks with defined sizes of 8 by 8 pixels, giving a block resolution of 80 by 60. In one implementation, the video frames are transmitted as JPEG images, and object data relating to a video frame is embedded in a corresponding transmitted JPEG image frame as an application-specific header segment.

In one implementation, each video frame is divided into blocks of equal size. In one embodiment, each block corresponds to a single pixel of the video frame. In an alternative implementation, each video frame is divided into blocks of different sizes. For example, one embodiment utilises blocks of a smaller size at a top of a video frame and blocks of a larger size at a bottom of the video frame, in order to compensate for the perspective of the video camera that captured the video frame. Such an embodiment may be utilised, for example, for video frames captured by a telephoto surveillance camera.

Each video object detected in a video frame is associated with a subset of the plurality of blocks into which the video frame is divided. An object mask consists of a binary mask with the block resolution, wherein an object mask associated with a current video frame includes all of the objects detected in the current frame.

Each video object is also associated with additional metadata, including an indication of the object stability. Object stability is the average percentage of the time that the subset of blocks associated with a detected object have had the appearance that those blocks have at a present time, and is a property that can be detected by some object detection systems. Thus, if a detected object is stationary in a scene over a period of time and has few or no objects passing in front of it during that time, the subset of blocks associated with that detected object will have a high object stability for that period of time, indicating that the detected object has not moved very much and that it has been visible for much of that time. In contrast, a subset of blocks associated with a recently detected object will have a low object stability, thus indicating that the presence of the detected object is a recent event and not generally representative of the scene over the period of time under consideration. It is also possible for an object to have a low stability but for it to have been stationary in the scene over a long period of time, indicating that the object has often been obscured.

For the purpose of an embodiment of this disclosure, a video object tracking system annotates each video object detected in a scene with a set of parameters. In one implementation, the additional metadata associated with a detected object includes the set of parameters associated with that detected object. In this embodiment, the set of parameters for each detected object includes a speed of the object in the x and y directions. Object velocity will be described in terms of x-speed and y-speed in units of number-of-blocks/frame. This assumes a constant frame-rate, but it is simple to convert between a known variable frame-rate and a fixed frame-rate for the purposes of calculating x-speed and y-speed.

Abnormal Events

Disclosed herein is an Abnormal Behaviour Detection System for detecting abnormal events in one or more video frames. The Abnormal Behaviour Detection System determines a set of behaviour statistics for an object detected in a video frame. The video frame is divided into a plurality of blocks, each block being associated with a set of behaviour modes, and each detected object is associated with a subset of those blocks. For each block associated with a detected object, the system compares the set of behaviour statistics relating to that block for the detected object with the set of behaviour modes associated with that block. Based on the comparison, the system determines an abnormality measure for each block.

The abnormality measure provides an indication of how similar the behaviour of the detected object is to behaviour modes acquired over time for each block. The system then utilises the abnormality measures to classify the behaviour of the detected object. The abnormality measures can thus be used to trigger an alarm or event when the behaviour of the detected object is classified as being beyond a range of normal behaviour and thus indicative of abnormal behaviour. The behaviour of the detected object can be classified based on a difference between the abnormality measures and one or more abnormality thresholds, wherein each threshold may indicate a level of abnormal behaviour.

Depending on the particular application, abnormal behaviour may relate to an abnormality measure associated with a single block exceeding a threshold, or an average or mean of abnormality measures associated with a detected object exceeding a threshold, or any combination thereof. Different blocks may have different weights applied to the corresponding abnormality measures, which allows a system to be more or less sensitive to classifying abnormal behaviour in one or more predefined portions of a video frame under analysis.

When an embodiment of the Abnormal Behaviour Detection System starts up, there is a quantitative difference between an abnormal event as far as the system is concerned, and an abnormal event as far as a scene shown in a sequence of video frames is concerned. For example, if there is an object in a first frame of a video sequence that is being analysed, as far as the Abnormal Behaviour Detection System is concerned, that object has not appeared in the scene before, and so logically the appearance of that object in the first frame would be considered abnormal. However, this is just because the Abnormal Behaviour Detection System has not yet collected enough information about the scene to decide whether the object is abnormal or not.

This discrepancy is typically handled by defining a predefined or set "training period", in which the Abnormal Behaviour Detection System can observe the scene without triggering Abnormal Behaviour events. Alternatively, any thresholds used for triggering an abnormal event may be weighted during the training period. However, as described later in step 802 of the Abnormal Behaviour Detection System, an exemplary embodiment has a more sophisticated system that takes into account that the System's knowledge of the scene gradually improves over a period of time.

In one implementation, an Abnormal Behaviour Detection System associates a set of behaviour modes with each block into which the video frame is divided. In one embodiment, the set of behaviour modes is initially empty and the system acquires information over time to populate the set with one or more behaviour modes. As indicated above, a training period may be used to allow the system to accumulate data relating to object behaviour before triggering any events. In another embodiment, the set of behaviour modes is pre-populated, based on behaviour expected of objects that might appear in the scene. The information for pre-populating the set of behaviour modes may be derived from information acquired from analysis of a similar scene, for example. In an alternative embodiment, a training period is used in combination with pre-populated sets of behaviour modes.

System Block Diagram

FIG. 1 is a schematic block diagram 100 of an abnormal behaviour detecting video camera system 110 that includes a lens system 101, which focuses on and captures a scene on one or more video frames and sends video frames 102 to an Object Detection subsystem 103. The Object Detection subsystem 103 analyses the video frames 102 received from the lens system 101 to detect video objects and then produces video object information relating to those detected video objects. In one implementation, the video object information produced by the Object Detection Subsystem 103 includes an object mask, as will be described with reference to FIG. 3, and metadata associated with each individual detected object. The metadata can include, for example, a set of parameters associated with the object, such as object size and stability.

The Object Detection subsystem 103 sends the video object information and video frames 104 to an Object tracking subsystem 105. The Object tracking subsystem 105 analyses the detected video objects and determines corresponding tracking information for each detected video object, such as the object speed and a persistent object identification tag. The object tracking subsystem 105 then associates the tracking information with the detected video objects and sends the video frames and objects, annotated with tracking data, by a coupling link 106 to an Abnormal Behaviour Detection Subsystem 107. The Abnormal Behaviour Detection Subsystem 107 determines a level of abnormality for each object, and annotates each object with an abnormality metric. The Abnormal Behaviour Detection Subsystem 107 may also determine that one or more objects exhibit behaviour that is sufficiently abnormal, based, for example, on a threshold or range of acceptable behaviour, to trigger an abnormality event. The video frames, objects (annotated with tracking data and abnormality metric) and abnormality events are sent by a link 108 to a viewer/recorder 109, which shows one or more of the video frames, objects, and events, or any combination thereof, to an end user.

A Typical Scene

Figure 2:
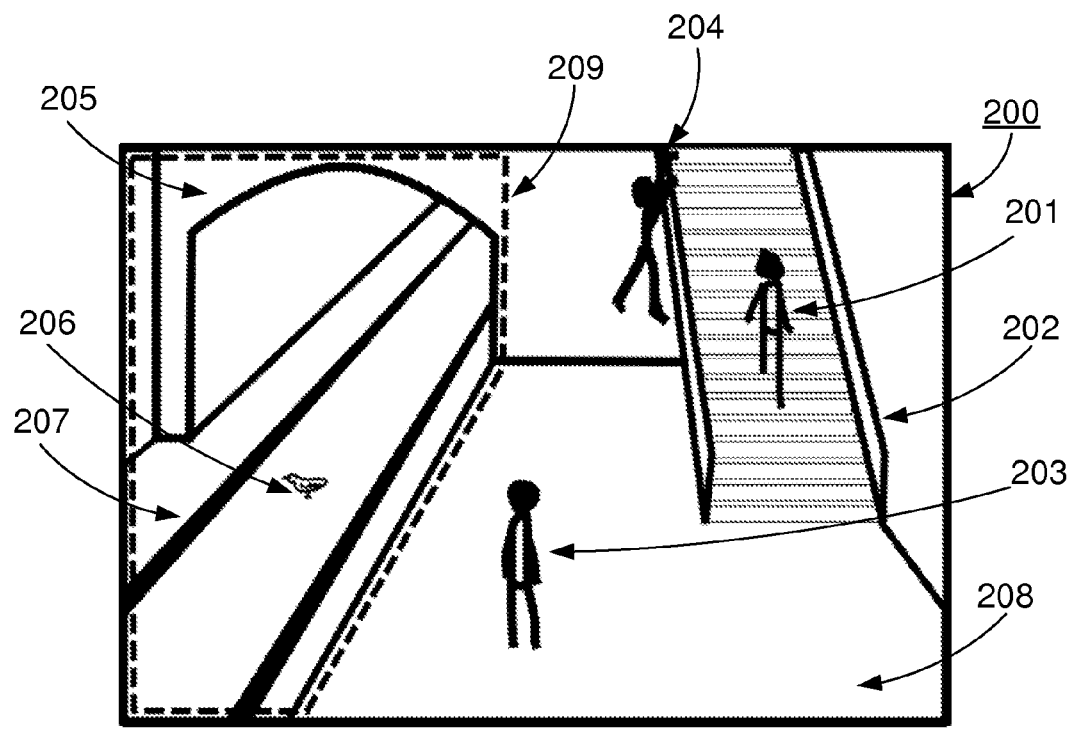
FIG. 2 is a diagram illustrating a video frame of a scene being captured by a surveillance network video camera.

FIG. 2 shows a video frame of a scene 200 captured by a surveillance network video camera. The scene 200 relates to a train platform 208 at a train station, with a set of stairs 202 providing access to and from the platform 208. The scene 200 shows three people: one person 201 walking down the stairs 202, one person 203 standing on the train platform 208, and one person 204 hanging from a railing on the stairs 202. The scene 200 also shows a train tunnel 205 and train tracks 207, with a bird 206 on the train tracks 207. In this case, a security professional would likely want to know about the person 204 hanging from the railing, but not be concerned about the people 201, 203 on the stairs 202 and platform 208, respectively, or the bird 206 on the tracks 207.

Using a conventional rule-based video analytics system to detect events of interest, a security professional creates a region of interest that is configured to trigger an event if a person-sized object enters that area of interest. In the example of FIG. 2, a security professional creates a region of interest 209 defining an area around the train tracks 207 and configures the system to trigger an event if a person-sized object enters the area 209, thus detecting the presence on the train tracks 207 of a person who is at risk of being hit by a train. The system would preferably be configured not to trigger an event if a train-sized or bird-sized object was in the region of interest 209. However, it might not occur to the security professional to set up a separate region of interest to detect a person hanging from the railing. An advantage of an abnormal behaviour detection system over pre-defined rules is the ability of the abnormal behaviour detection system to detect whether a situation is unusual without having to predefine every situation that might be unusual.

Figure 3:
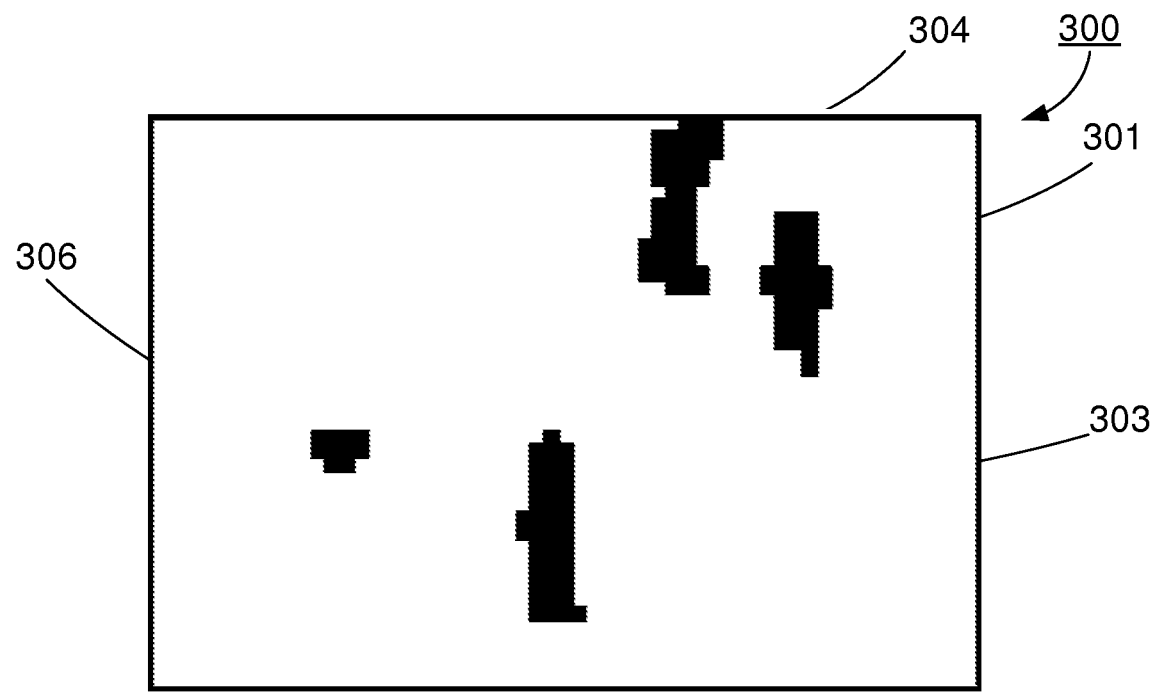
FIG. 3 is a diagram illustrating an object mask created by an object detection subsystem analysing the scene in FIG. 2.

FIG. 3 shows an object mask 300 of the video frame 200 of FIG. 2, as prepared by an Object Detection subsystem 103 using one or more existing object detection methods. Many object detection methods are known in the art and will not be described in depth here. A typical object detection method uses the unchanging data over multiple frames to establish a model of the background of the scene. That is, parts of the scene that change appearance only within a specified threshold are used to construct a background model. Parts of the scene that are not sufficiently similar to the background model are considered to be objects.

The object mask 300 includes an object representation 301 of the person 201 walking down the stairs 202, an object representation 303 of the person 203 standing on the train platform 208, an object representation 304 of the person 204 hanging from the railing on the stairs 202, and an object representation 306 of the bird 206 on the train tracks 207. Note that the resolution of the object mask 300 may be different from the resolution of the original video frame 200. In an alternative embodiment, the resolution of the object mask 300 is the same as the resolution of the original video frame 200.

Figure 4:
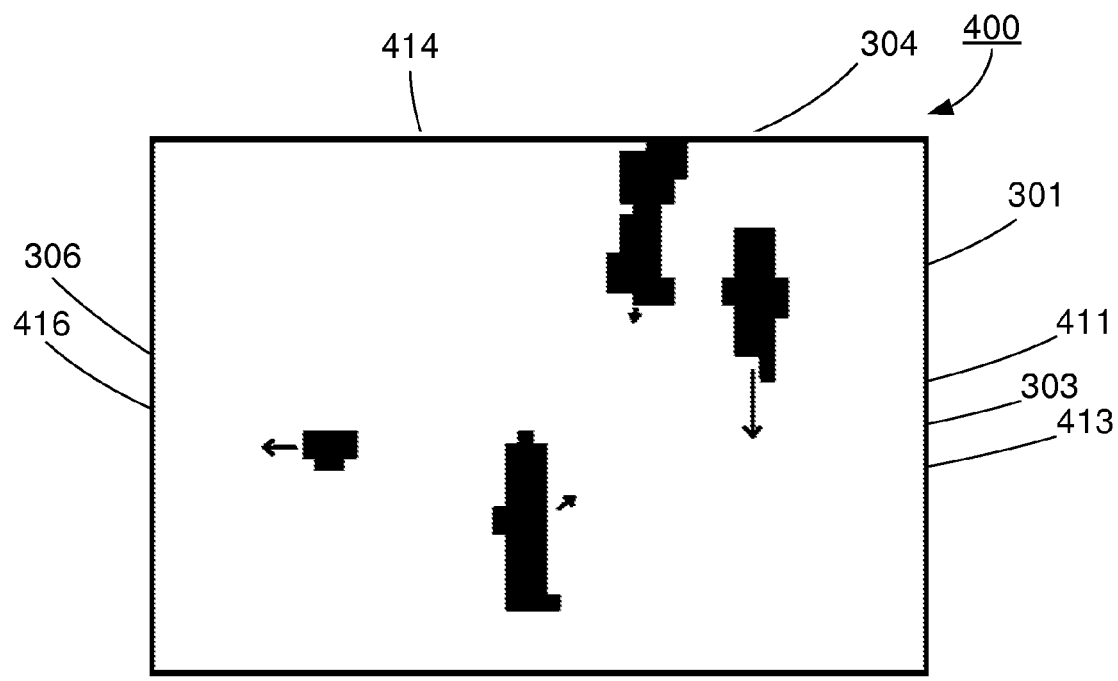
FIG. 4 is a diagram illustrating an object mask annotated with directions of movement created by an object tracking subsystem analysing the scene in FIG. 2.

FIG. 4 demonstrates an elementary object track viewer representation of objects with tracking data as prepared by the Object Tracking Subsystem 105. The object track viewer representation shows an object mask 400 of the video frame 200 of FIG. 2, as prepared by the Object Detection Subsystem 103. The object mask 400 shows a representation of tracking metadata associated with each object as prepared by the Object tracking subsystem 105 using methods known in the art. The object mask 400 includes indications of the current velocities 411, 413, 414 and 416 associated with each object. The velocity 411 is associated with object 301 representing the person 201 walking down the stairs 202; the velocity 413 is associated with object 303 representing the person 203 walking around on the train platform 208; the velocity 414 is associated with object 304 representing the person 204 hanging from the railing above the stairs 202; and the velocity 416 is associated with object 306 representing the bird 206 on the train tracks 207.

Mode-based Behaviour Model

Figure 5:
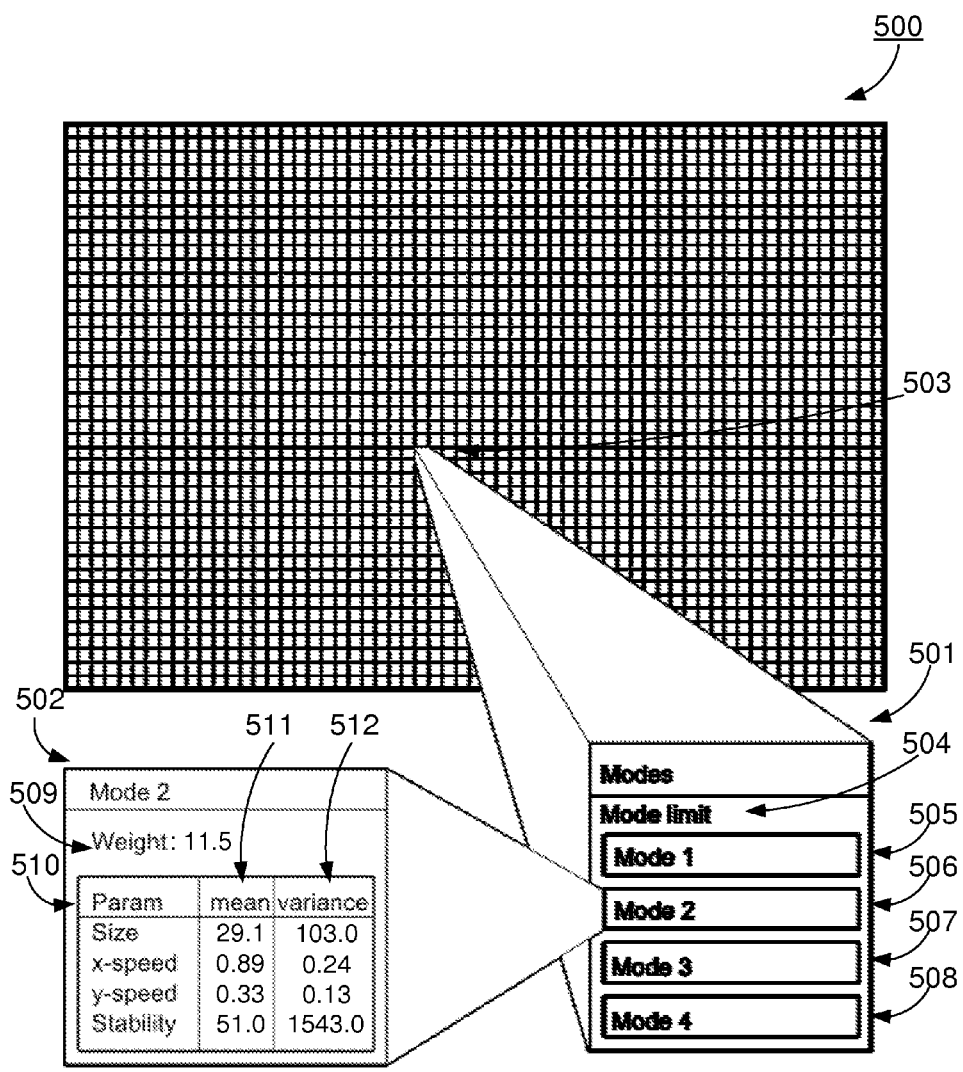
FIG. 5 is an illustration of the structures used to store mode information in a mode-based object behaviour model.

FIG. 5 shows a structure of an exemplary behaviour model used for identifying abnormal behaviour in a video scene, using object and tracking data as shown in the object mask 400 of FIG. 4. The model consists of an array 500 in memory, wherein the array represents bins in two dimensions x and y corresponding to the video scene 200 from FIG. 2. Each bin (x,y) is called a behaviour model block. A sample behaviour model block 503 is expanded to show in an expanded model block view 501 that the behaviour model block 501 includes a "Mode limit" variable 504, which is an indication of the maximum number of modes that the block may hold. In the exemplary embodiment, the Mode limit is hardcoded to 4, but in alternative embodiments the mode limit may vary according to user input and/or (x,y) position. The more modes that are used in a particular implementation, the less grouping there will be of expected behaviour, but the more distinct behaviours present at the block can be expressed.

The behaviour model block 501 also holds a set of behaviour modes 505, 506, 507, and 508, not exceeding the maximum set by the mode limit 504. Each behaviour mode can be expanded to show in an expanded behaviour mode view 502 that each behaviour mode includes a list of means 511 and variances 512 for each one of a set of parameters 510, as well as a weight 509 that is described later. In this example, the set of parameters 510 associated with each behaviour mode includes size, x-speed, y-speed, and stability. By holding a set of behaviour modes 505, 506, 507, 508 within a behaviour model block 501, distinct behaviours of objects associated with the block can be stored separately. For example, in a block with half of the objects moving to the left and half of the objects moving to the right, the multi-modal method allows one behaviour mode of "moving left" and another behaviour mode of "moving right" to be stored. If only one motion vector is used to represent the behaviour of the objects, the motion vector will be zero, which is not a good representation of the behaviour of the objects associated with the block.

In this example, a set of four behaviour modes is associated with each behaviour model block. When analysing a video frame, a detected object and an associated set of parameters are processed to determine a set of behaviour statistics associated with that detected object for a current behaviour model block. The set of behaviour statistics is then compared against each behaviour mode in the set of behaviour modes for the current behaviour model block to determine how well that behaviour mode matches the behaviour statistics of the detected object that is being processed. The method then determines an abnormality measure for each block associated with the detected object, based on how well the behaviour statistics for the detected object match the set of behaviour modes associated with the behaviour model block. The method then classifies the behaviour of the detected object based on the abnormality measures.

In the example set of parameters 510, the set of behaviour statistics derived from the object detection and tracking modules includes object size, speed in the x and y direction, and stability. Examples of behaviour statistic values for a mode include a weight of 11.5, a mean size of 29.1 with a variance of 103.0, a mean x-speed of 0.89 with a variance of 0.24, a mean y-speed of 0.33 with a variance of 0.13, and a stability of 51.0 with a variance of 1543.0. From this, one can determine that this mode represents objects that pass through this block which are relatively small (as the size is presented in units of number of blocks, and the maximum size for a 60×80 array of blocks is 1400), and travelling to the right and downwards, with a medium stability. Note that other modes for this block may show other observed behaviours.

The set of behavioural statistics may optionally include other statistics derived from object detection and tracking modules, as well as inputs from other modules, such as face detection and human body detection modules. Examples of behavioural statistics are object age as detected by an object tracker; lowest object y-value as detected by the object detection module; aspect ratio, as detected by the object detection module; presence of a face as determined by a face detection module; and presence of a human body as determined by a human body detection module.

Abnormal Behaviour Detection System Flow Diagrams

Figure 6:
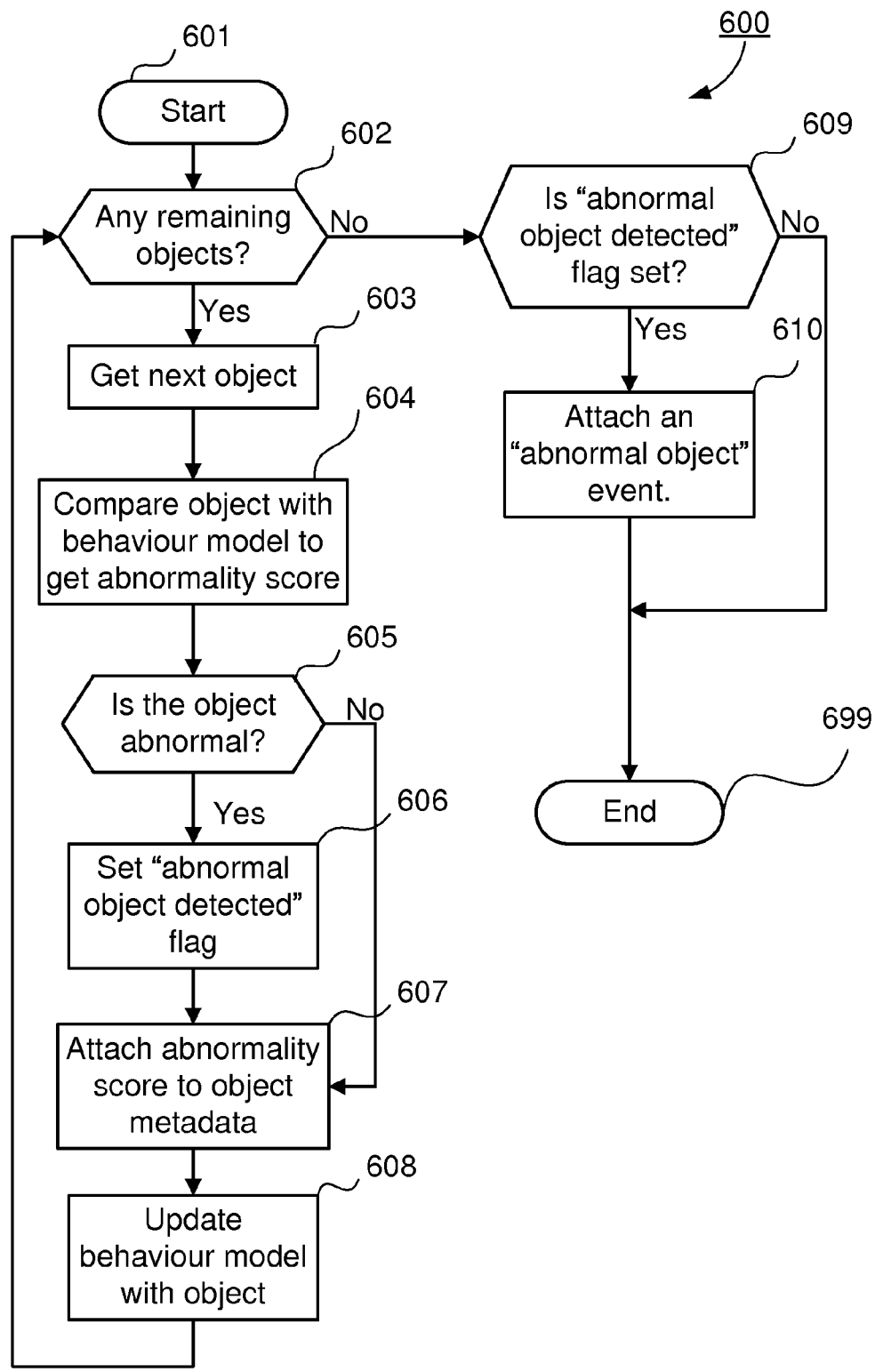
FIG. 6 is a schematic flow diagram illustrating a method of detecting abnormal behaviour according to one embodiment of the present disclosure.

FIG. 6 is a flow diagram for a method 600 performed by the Abnormal Behaviour Detection subsystem 107 of FIG. 1. The method annotates each detected object in a video frame with an "abnormality score". If any of the objects are sufficiently abnormal, as indicated by having an associated abnormality score that is greater than a predefined abnormality threshold, the method causes an "abnormal object detected" event.

The method 600 begins at a Start step 601 with an input of a video frame and any associated detected video objects, each detected video object being annotated with tracking metadata. The method processes each object in turn, and starts by checking at decision step 602 whether there are any remaining objects to be processed. If there are further objects to be processed, Yes, control passes to step 603 to select a next object, and then control passes to step 604, which compares the selected object with a behaviour model to determine an abnormality score for that object. Step 604 will be described further with reference to FIG. 7.

Control passes from step 604 to step 605, which compares the resulting abnormality score associated with the current object with a previously chosen (predefined) threshold to determine whether the object is abnormal or not. In one embodiment, a user of the system chooses in advance a threshold to indicate just how abnormal a value must be before the abnormality score causes an event. If the abnormality score is greater than or equal to the predefined threshold, Yes, the process proceeds to step 606 and sets an "abnormal object detected" flag. The process then proceeds to step 607, wherein the abnormality score is attached to the object metadata associated with the object being processed, for the information of the user. If at step 605 the abnormality score is less than the predefined threshold, the process goes directly from step 605 to step 607.

Following step 607, the process proceeds to step 608, which updates the behaviour model with the object information. Step 608 will be described in further detail with reference to FIG. 9. Following step 608, the process returns to step 602 to determine if there are further objects for processing. When all objects have been processed, there are no remaining objects to be processed, No, and the process passes from step 602 to step 609, which checks whether the "abnormal object detected" flag was set in step 606 when processing any one of the detected objects. If the "abnormal object detected" flag was set during the processing of the objects in the video scene, Yes, the process continues from step 609 to step 610, which attaches an "abnormal object" event to the output data, thus allowing an event-aware user to be informed that at least one of the objects is considered to be abnormal. The process then terminates at step 699. If the "abnormal object detected" flag was not set in step 609, No, the process terminates at step 699.

Figure 7:
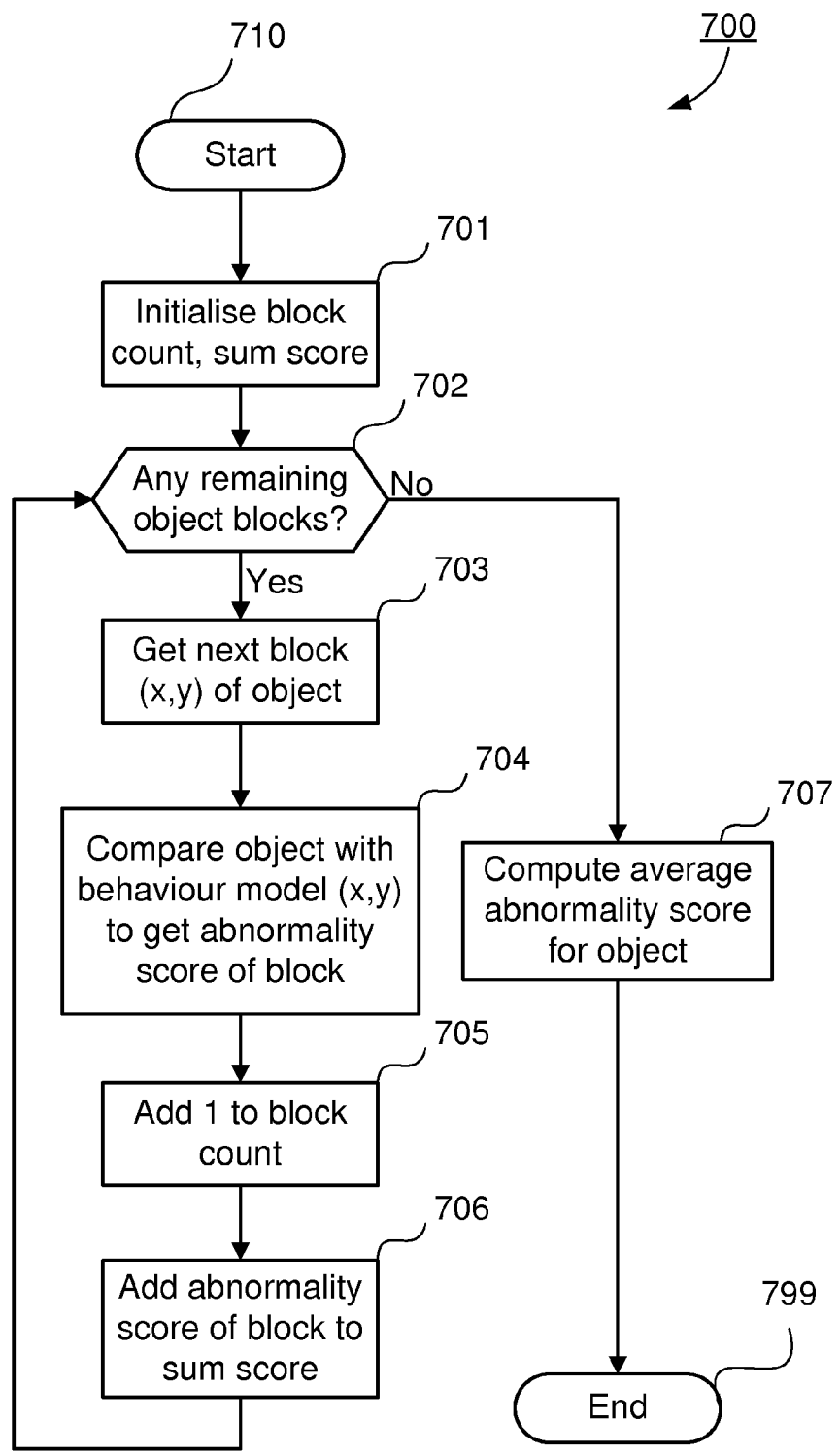
FIG. 7 is a schematic flow diagram expanding upon a step 604 of FIG. 6.

FIG. 7 is a flow diagram 700 for a behaviour model to object comparison subsystem, as may be utilised in step 604 of FIG. 6. The behaviour model to object comparison subsystem obtains an average abnormality score for all blocks in the scene that contribute to an object that is currently being processed. The process begins at a Start step 710 with an input of the set of blocks and set of behaviour parameters for each block of a single object. The process continues to step 701, where a block count and a sum abnormality score, to be used in subsequent steps 705, 706 and 707, are initialised to 0. The process continues to a decision step 702, which checks whether there are any remaining object blocks, thus determining whether all the blocks that make up the object have been processed yet. If there are remaining unprocessed blocks, Yes, control passes from step 702 to step 703, which retrieves a next unprocessed block of the object, at the co-ordinates (x, y). The process then continues to step 704 and compares the object with a behaviour model at the same co-ordinates (x, y) to obtain an abnormality score of the block. Step 704 will be described in further detail with reference to FIG. 8.

The process then continues to step 705, which increments the count of the number of processed blocks. The process then continues from step 705 to step 706, which adds the abnormality score obtained in step 704 to a sum abnormality score. The process then returns to step 702 to determine whether there are any remaining object blocks and continues until there are no further unprocessed object blocks. When there are no remaining object blocks to be processed at step 702, No, the process passes to step 707, which computes an average abnormality score of the object as being the sum abnormality score divided by the block count. The process then terminates at step 799.

In an alternative embodiment, instead of calculating the mean abnormality score over the blocks of the object, the maximum abnormality score is computed.

In another alternative embodiment, instead of calculating the mean abnormality score over the blocks of the object, the user provides an abnormality threshold T; and the system returns the percentage of the object blocks for which the abnormality score exceeded that threshold T.

In another alternative embodiment, instead of calculating the mean abnormality score over the blocks of the object, a weighted mean abnormality score is calculated. For this embodiment, the calculation of the average abnormality score proceeds as in FIG. 7, except that the user predefines a weight w for each block of the scene; and in step 705 the system instead adds the predefined weight w to the block count; and in step 706 of this embodiment, the system instead adds the abnormality score multiplied by the predefined weight w to the sum score. In this way, the user can define blocks of the scene for which the user is more interested in abnormal activity.

Figure 8:
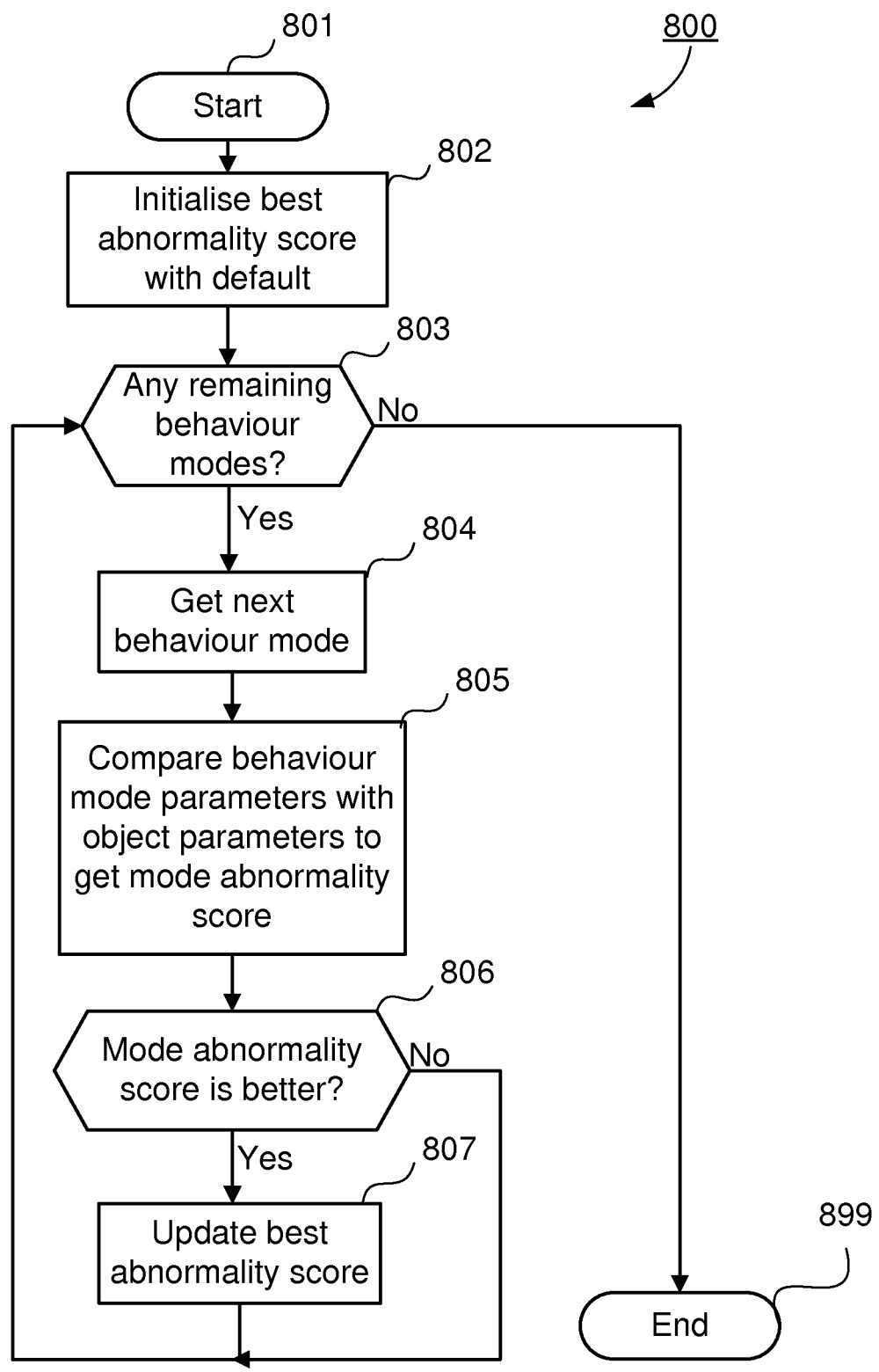
FIG. 8 is a schematic flow diagram expanding upon a step 704 of FIG. 7.

The flow diagrams of FIGS. 6 and 7 have described only in general terms a method for calculating an abnormality score for an object by comparing the object with a behaviour model. In FIG. 8, an exemplary embodiment of a mode-based method is used for calculating the abnormality score, using the structure described in FIG. 5. FIG. 8 is a flow diagram 800 for functionality of the behaviour model to block comparison subsystem 704 of FIG. 7. The behaviour model to block comparison subsystem 704 examines a set of behaviour modes to find a closest match to the video object information associated with a detected object, broadly referred to as "object data", and produce an abnormality score, but sets a default score if there are no matching modes or if the score is too bad, taking into consideration the amount of data examined so far. The process starts at a Start step 801 with input data being: (i) the object data; and (ii) the behaviour mode block to which the object data is to be compared. The process continues at step 802 by initialising a best abnormality score to a default value. The default value is the worst possible abnormality score that could be produced by the process described in FIG. 8. The value of the default is a constant defined by the user, and modified by the number of frames processed so far, according to the equation:

$$\text{default\_abnormality\_score} = \text{user\_default} \cdot \min(\text{num\_frames\_processed}/\text{initialisation\_period}, 1) \quad (1)$$

where:
default_abnormality_score is the default abnormality score that is used if the calculated abnormality score is worse, or if no abnormality score can be calculated by comparing with modes;
user_default is the default abnormality score as set by the user and is an indication of the number of standard deviations away from normal that the result indicates (in the exemplary embodiment, the default user_default in the absence of user choice is 3);
the function min(x, y) provides the minimum of the two arguments x and y;
num_frames_processed is the number of frames processed so far by the system; and
the initialisation_period is the number of frames in which the user considers is the Abnormal Behaviour Detection System scene knowledge to be incomplete (in the exemplary embodiment, the default initialisation_period is set to be equivalent to one hour, i.e., 3600 multiplied by frame_rate, where frame_rate is the number of frames per second that the video surveillance camera produces).

The use of num_frames_processed compensates for an initial lack of knowledge by the Abnormal Behaviour Detection System about the scene, by reducing the worst-case Abnormality score over an initialisation period. The duration of the initialisation period depends on the particular application. As previously mentioned, such an initialisation or training period may be used in conjunction with pre-populated data based on expected object behaviour, and may alternately or additionally depend on the total weight score for all the modes in all the blocks of the behaviour model rather than a simple count of the frames.

Following the initialisation of the best abnormality score 802, the process continues to examine each of the behaviour modes from a set of behaviour modes associated with the behaviour mode block that is being processed. Control passes to decision step 803 to determine whether there are any remaining behaviour modes. If there is a remaining behaviour mode that has not yet been processed, Yes, the process continues to step 804, which retrieves a next unprocessed behaviour mode and then the process proceeds to step 805, which compares the behaviour mode parameters with object parameters to determine a mode abnormality score. In one embodiment, the object parameters are a set of behaviour statistics associated with the detected object and derived from a set of parameters associated with the detected object by an object detection module and an object tracking module.

Several parameters are used to calculate the abnormality score for a mode. In this example, the following parameters are used:
size (the number of blocks that contribute to the current object),
x-speed (the velocity of the blocks object in the horizontal direction calculated by the object tracking subsystem 105, in units of blocks per frame),
y-speed (the velocity of the blocks object in the vertical direction calculated by the object tracking subsystem 105, in units of blocks per frame), and
stability (the stability of the blocks object calculated by the object detection subsystem 103, as a percentage).

Note that while the exemplary embodiment uses four parameters, another embodiment could use other, additional parameters, or fewer parameters selected from those listed above, or otherwise, depending on the particular application.

The equation for calculating the abnormality score S is $$S = sqrt(S(p1)^2 + S(p2)^2 + \ldots + S(pN)^2) \quad (2)$$

where:
N=4,
S(pX) is the score for parameter X,
p1 is size,
p2 is x-speed,
p3 is y-speed; and
p4 is stability.

In an alternative embodiment, additional or different parameters could easily be added to the equation. Equation (2) produces a number that is a measure of how far away from normal the current object parameters are for this mode. A mode abnormality score of 0 would represent a completely normal value, and a score of (say) 4.5 would indicate a value approximately 4.5 standard deviations from what is expected given the data so far for this mode.

The equation for calculating the score for an individual parameter is:

$$S(f) = (P(f) - Q(f))/sqrt(V(f)) \quad (3)$$

where:
S(f) is the score for the parameter,
P(f) is the value of this parameter for the object,
Q(f) is the mean value of this parameter for the mode 511, and
V(f) is the variance of the mode 512 (i.e., a measure of how spread out the values are for this mode).

Figure 10:
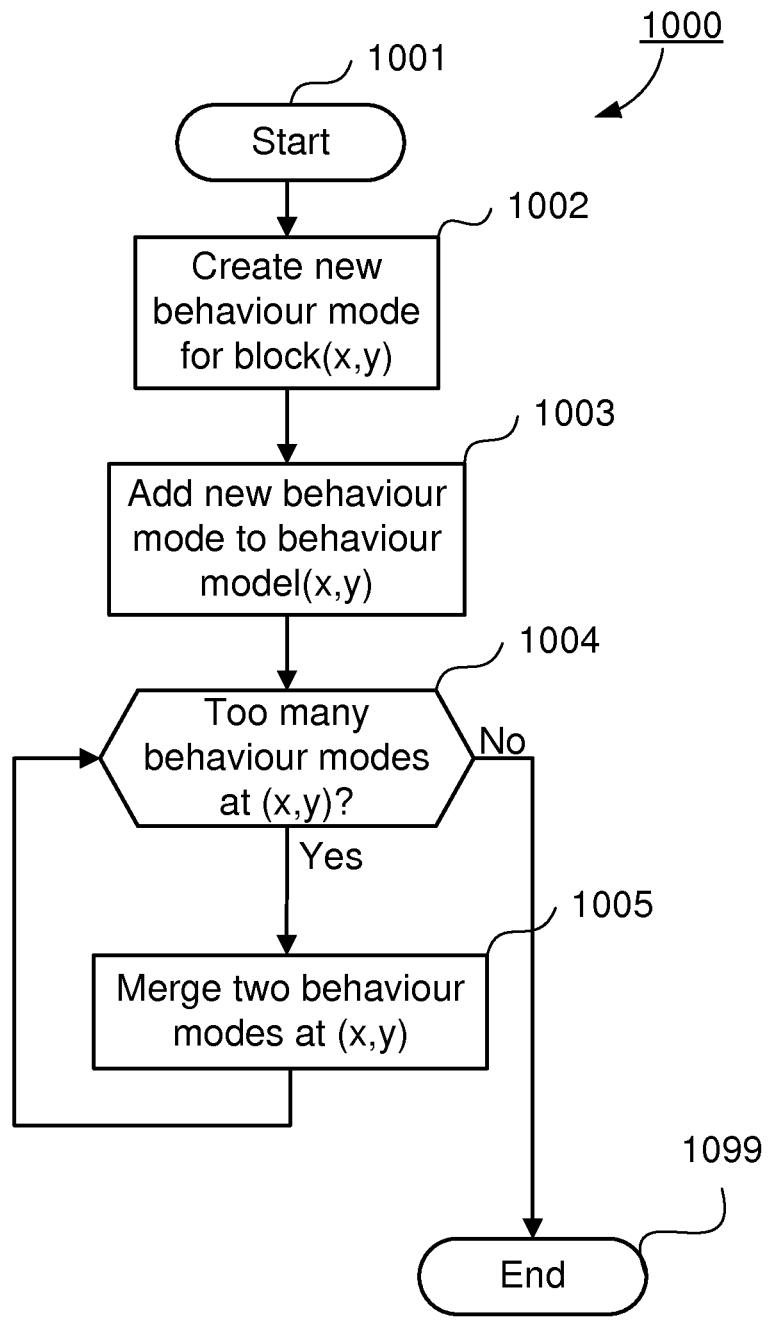
FIG. 10 is a schematic flow diagram expanding upon a step 904 of FIG. 9.

The values Q(f) and V(f) for the mode were previously created in the behaviour model update step 608 of FIG. 6, and are discussed in further detail in FIG. 10, in step 1002.

In an alternative embodiment, the abnormality score S is calculated by considering the collection of behaviour modes as describing a probability density function, and an abnormality score for an object is based on using the parameter scores for that object as parameters to the function. For example, the probability score for each behaviour mode may be calculated as:

$$P(m) = \text{product}(p(f\_mean, f\_variance) * (S(f))) \quad (4)$$

where:
f represents each of size, x-speed, y-speed and stability,
f_mean and f_variance represent the means and variances of the parameter f, and
$p(\mu, \sigma^2)$ is the probability density function of a Gaussian distribution with mean n and standard deviation 6.
The product(x) is then the product of all the values of x produced for each parameter f.
The abnormality score is then calculated as:

$$s = \text{sum}(\text{weight}(m)) / \text{sum}(\text{weight}(m) * P(m)) \quad (5)$$

where:
m represents each of the behaviour modes, and
weight(m) is the weight of each behaviour mode.
Note that if there are no behaviour modes, the abnormality score is undefined, and so is considered to be default_abnormality_score, as defined in 802. The sum(x) is then the sum of all the values x produced for each parameter m.

Once the mode abnormality score is obtained in step 805, the process continues to a comparison step 806, where the mode abnormality score is compared with the best abnormality score. If the mode abnormality score is lower than the best abnormality score, Yes, the process continues to setting step 807, where the best abnormality score is set to the mode abnormality score obtained in step 805, and then the process returns to step 803. Otherwise, if at step 806 the mode abnormality score is not lower than the best abnormality score, No, the process goes straight to step 803. Once there are no more remaining unprocessed behaviour modes at step 803, No, the process continues from step 803 to an end step 899.

Figure 9:
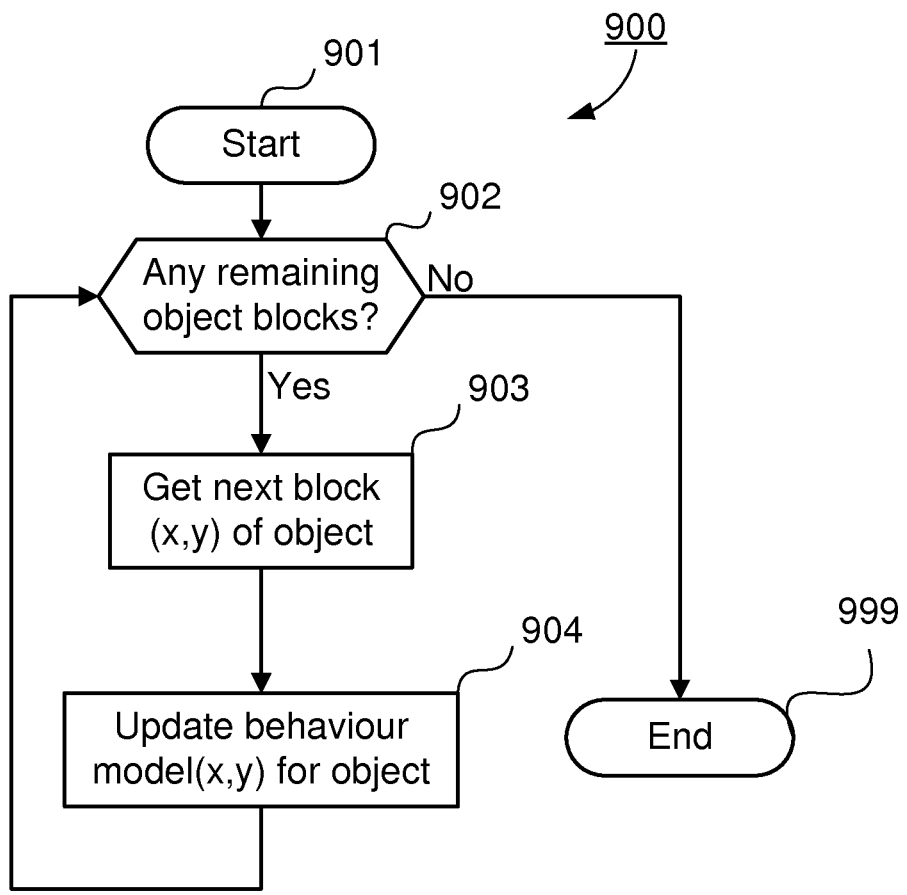
FIG. 9 is a schematic flow diagram expanding upon a step 608 of FIG. 6.

FIG. 9 is a flow diagram 900 describing how to update a behaviour model with an object 608. The flow diagram describes how to iterate through the blocks that comprise an object and update the behaviour model for each block. The process begins at a Start step 901 with an input of object data relating to a detected object. The flow diagram 900 continues to decision step 902, which checks whether all the blocks that make up the object have been processed yet. If there are remaining unprocessed blocks, Yes, the process continues to step 903, which retrieves a next unprocessed block of the object, at the co-ordinates (x,y). The process then continues to step 904, which updates the behaviour model, as exemplified in array 500 of FIG. 5, at the co-ordinates (x,y) with the object data. This step is described in further detail with reference to FIG. 10. The process then returns to step 902, where the process 900 checks again whether there are any remaining unprocessed blocks. If there are no further unprocessed blocks, No, control proceeds to step 999, where the process 900 terminates.

FIG. 10 is a flow diagram 1000 describing how to update a behaviour model at a particular block (x,y) 904. The flow diagram 1000 describes the process of adding and merging behaviour modes to update the behaviour model. The process starts at a Start step 1001 with an input of object data relating to a detected object and the co-ordinates (x,y) of a behaviour model block 501 for which the behaviour modes will be updated. The process continues to step 1002, which creates a new behaviour mode using the object data of size, x-speed, y-speed and stability. In an exemplary embodiment, the mean value 511 of each parameter 510 is set to the corresponding value associated with the detected object that is being processed. The variance 512 of each parameter 510 is set to be the square of the default initial standard deviation for that parameter, as follows:

For size, the default initial standard deviation of one embodiment is set to be 1% of the number of blocks in the scene. For example, with a block resolution of 80 by 60, there are 4800 blocks in the scene and the default initial standard deviation in size is set to be 48.

For x-speed, the default initial standard deviation of one embodiment is set to be 5% of the horizontal resolution of the scene in blocks. For example, with a horizontal resolution of 80, the default initial standard deviation in x-speed is set to be 4.0.

For y-speed, the default initial standard deviation of one embodiment is set to be 5% of the horizontal resolution of the scene in blocks. For example, with a vertical resolution of 60, the default initial standard deviation in y-speed is set to be 3.0.

For stability, the default initial standard deviation of one embodiment is set to be 10%.

The mode weight 509 is initially set to be 1.

Once the new behaviour mode has been created in step 1002, the process then continues to step 1003, which appends the new behaviour mode to the behaviour model for the specified (x,y) behaviour model block 501. The process then checks at decision step 1004 whether too many behaviour modes have been created for that behaviour model block by comparing the number of behaviour modes of the current block 501 with the mode limit 504 for that block. As long as there are too many behaviour modes in the current block, Yes, control passes to step 1005 and the process merges two of the behaviour modes, as described in more detail with reference to FIG. 11. Control returns from step 1005 to step 1004. Once the number of behaviour modes at step 1004 is equal to or less than the mode limit 504, there are not too many behaviour modes, No, and the process terminates at an End step 1099.

In an alternative embodiment, instead of merging two behaviour modes 1005 only when there are too many behaviour modes as determined at decision step 1004, the system merges any two behaviour modes for which the merge cost is less than a given threshold. This has the advantage of keeping the number of behaviour modes small, while allowing the number to grow in the case that the behaviour model for a block is complex.

Due to memory limitations, there may be a limit to the number of modes that can be stored for each block. Therefore, in a further embodiment, the system merges two modes when either the minimum cost of merging two modes is below a threshold, or when the number of modes exceeds a maximum.

Figure 11:
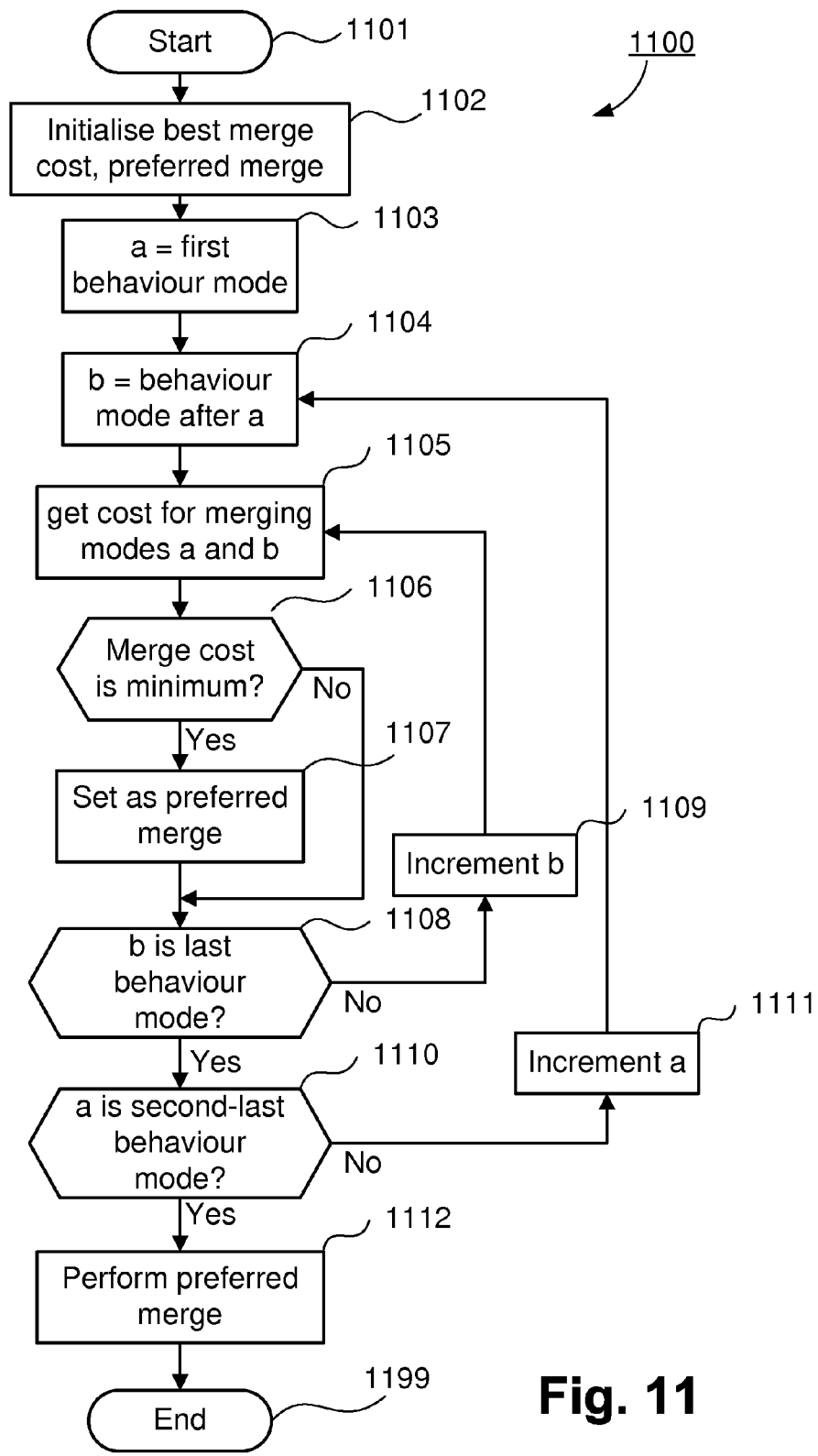
FIG. 11 is a schematic flow diagram expanding upon a step 1005 of FIG. 10.

FIG. 11 is a flow diagram 1100 describing how to merge two behaviour modes belonging to a block 1005. This method assumes the presence of at least two behaviour modes in a set of behaviour modes associated with a behaviour model block. FIG. 11 describes the process of looking at each possible pair of behaviour modes associated with the behaviour model block, calculating the cost of merging that pair of modes, and then choosing and merging the pair of modes with the smallest merge cost. The process starts at a Start step 1101 with an input of a current behaviour model block and object data relating to the detected object that is being processed. Control then passes to step 1102, which initialises a best merge cost and a preferred merge to be null. Control passes to step 1103, which sets a variable "a" to be the first behaviour mode, and in step 1104 sets a variable "b" to be the behaviour mode after mode "a". Thus, at this point variable "b" is set to be the second behaviour mode in the list of modes. The process then proceeds to step 1105 to calculate the cost for merging modes "a" and "b". First, a new merged mode is created using the following equations:

$$a\_coefficient = a(weight)/(a(weight)+b(weight)) \quad (6)$$

$$b\_coefficient = b(weight)/(a(weight)+b(weight)) \quad (7)$$

$$merge\_mode(f\_mean) = a(f\_mean)*a\_coefficient + (f\_mean)*b\_coefficient \quad (8)$$

where f_mean represents the mean of each of size, x-speed, y-speed and stability.

$$merge\_mode(weight) = a(weight)+b(weight) \quad (9)$$

The variance of the merged mode is calculated as the means of the variances of the contributing modes plus the variances of the means of the contributing modes, weighted by their respective co-efficients.

$$merge\_mode(f\_variance) = a(f\_variance)*a\_coefficient + b(f\_variance)*b\_coefficient + (a(f\_mean) - merge\_mode(f\_mean))^2 * a\_coefficient + (b(f\_mean) - new\_mode(f\_mean))^2 * b\_coefficient \quad (10)$$

One embodiment of the cost calculation for this mode is:

$$cost = distance(merge\_mode,a)*a(weight) + distance(merge\_mode,b)*b(weight) \quad (11)$$

where distance(g, h) is defined as:

$$distance(g,h) = sqrt((g(p1\_mean)-h(p1\_mean))^2/h(p1\_variance) + (g(p2\_mean)-h(p2\_mean))^2/h(p2\_variance) + \ldots + (g(pN\_mean)-h(pN\_mean))^2/h(pN\_variance)) \quad (12)$$

in which N=4, and p1 is size, p2 is x-speed, p3 is y-speed and p4 is stability.

This equation can be still used in an alternate embodiment with additional or different parameters.

In an alternative embodiment, the cost calculation is based on where the means of the pair of modes fall in the probability density function of the merged mode. For example, the cost may be calculated as $$cost = a(weight)/product(p(new\_mode(f\_mean), new\_mode(f\_variance)))(a(f\_mean))) + b(weight)/product(p(new\_mode(f\_mean), new\_mode(f\_variance)))(b(f\_mean))) \quad (13)$$

where $p(\mu,\sigma^2)$ is the probability density function of a Gaussian distribution with mean $\mu$ and standard deviation $\sigma$, and $p(\mu,\sigma^2)(x)$ returns the value of that probability density function for value x.

Returning to FIG. 5, having obtained the cost for merging modes "a" and "b" at step 1105, the process then proceeds to decision step 1106, which compares the calculated merge cost with a best merge cost to determine whether the calculated merge cost is a minimum. If the calculated merge cost is lower than the best merge cost or if the best merge cost is null, Yes, the process continues to step 1107, which sets the best merge cost to be the merge cost calculated in step 1105, sets the preferred merge mode to be the new created mode new_mode, and records the two modes that contributed to the new_mode. The process then continues to step 1108. If at step 1106 the calculated merge cost is determined to be not lower than the best merge cost, the process instead goes directly from step 1106 to step 1108.

In step 1108, the process checks whether the mode "b" is the last behaviour mode in the list. If mode "b" is not the last behaviour mode in the list, No, the process continues to step 1109, which increments "b", then continues on to step 1105. Otherwise, if mode "b" is the last behaviour mode in the list, Yes, the process continues on to decision step 1110. In step 1110, the process checks whether mode "a" is the second-last behaviour mode in the list. If mode "a" is not the second-last behaviour mode in the list, No, the process continues to step 1111, which increments "a", then continues on to step 1104. Otherwise, if at step 1110 it is determined that mode "a" is the second-last behaviour mode in the list, Yes, the process continues on to step 1112. Step 1112 performs the preferred merge by deleting the two modes that contributed to the preferred merge mode, and adding the preferred merge mode to the mode list. Finally, the process terminates at an End step 1199.

An issue with the approach of iterating through each block that contributes to an object and updating the model for that block 900 is that larger objects, or objects that move across the scene slowly, are disproportionately represented in the behaviour modes.

For example, if a narrow object and a wider object both move horizontally across a scene at the same speed, the larger object will overlap more blocks in each frame than the smaller object. In particular, the larger object will overlap any one block in a greater number of sequential frames. The larger object will, therefore, have a greater effect on the behaviour modes in those blocks.

In another example, an object that moves quickly across the scene will affect the behaviour modes of each block that it overlaps in only a small number of frames. An object of the same size that moves more slowly across the scene will affect the behaviour modes for a greater number of frames. A stationary object will overlap the blocks in the location of the stationary object for as many frames as the stationary object remains in that position in the scene, and will therefore have a very great effect on the behaviour modes of those blocks.

Therefore, a further embodiment compensates for this effect by weighting the effect of an object on a behaviour mode proportionally to the speed of that object, and in inverse proportion to the size of the object. In this embodiment, the mode weight 509 of a new mode created to update the behaviour model in step 1002 is calculated as:

$$W = sqrt(S(x\text{-}speed)^2 + S(y\text{-}speed)^2)/S(size) \quad (14)$$

where S(x-speed), S(y-speed) and S(size) are the object's scores for each of those parameters.

Figure 12:
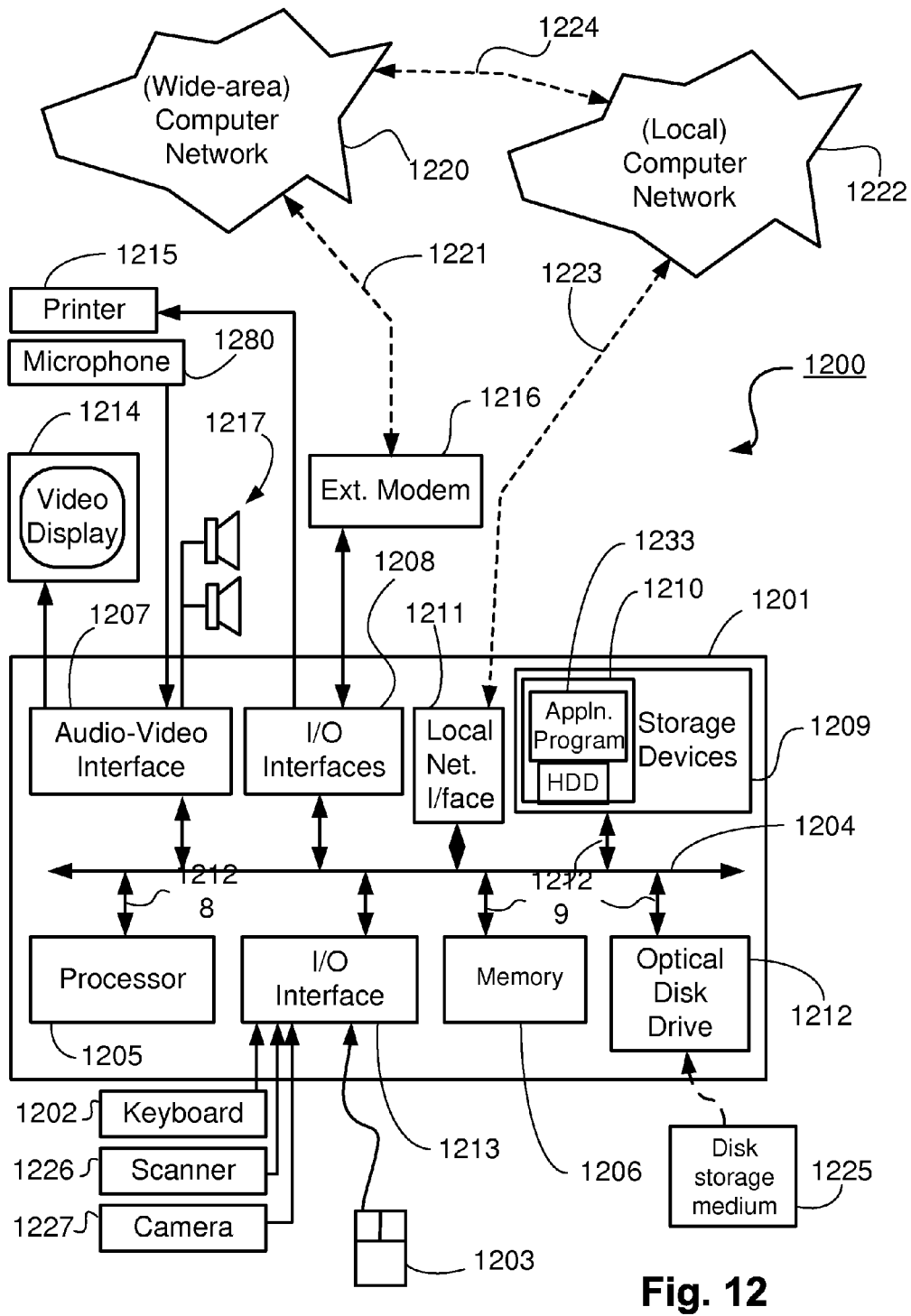
FIGS. 12 and 13 collectively form a schematic block diagram of a general purpose computing system in which the arrangements to be described may be implemented.
Figure 13:
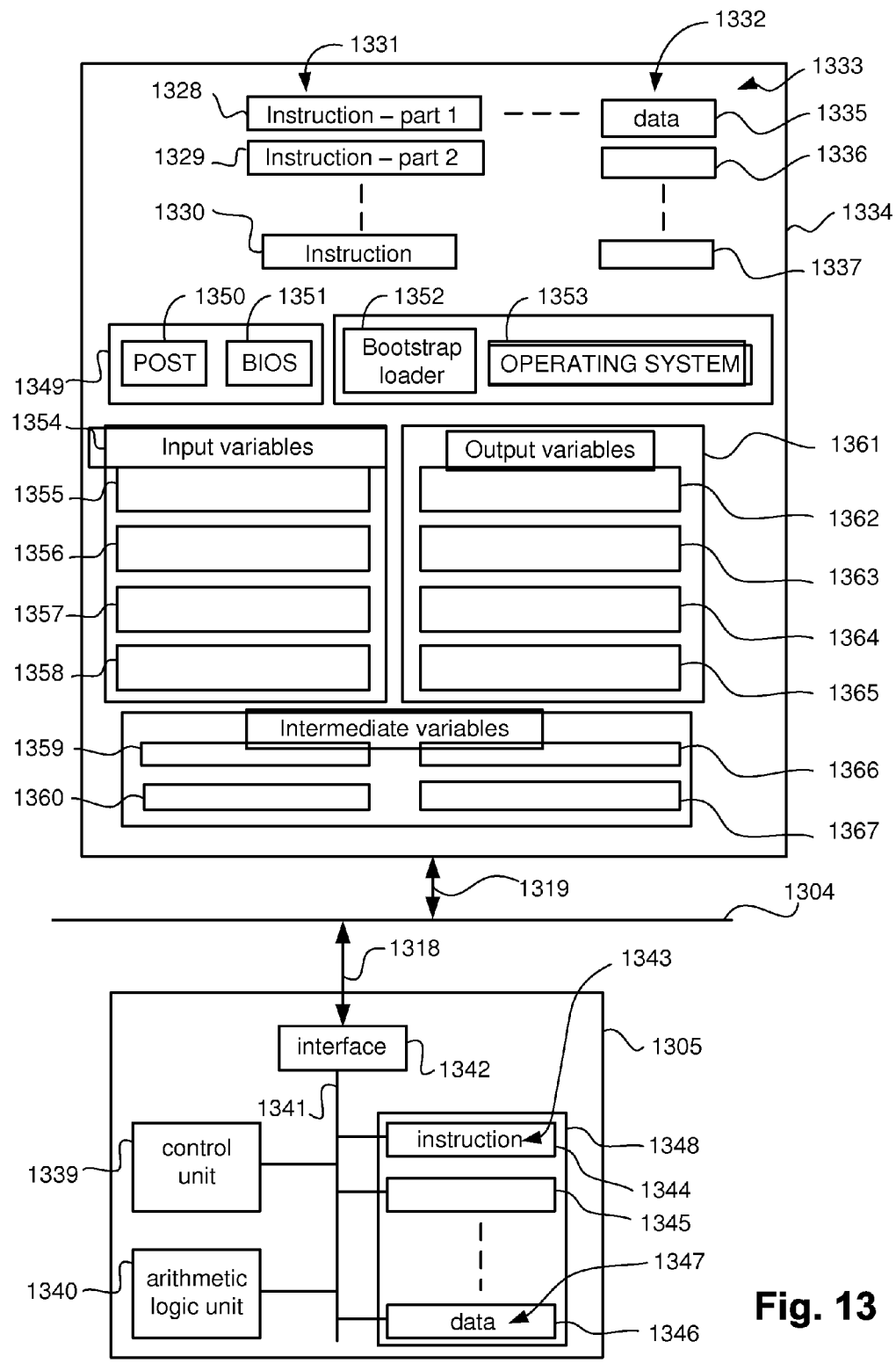

FIGS. 12 and 13 collectively form a schematic block diagram of a general purpose computer system 1200, upon which the various arrangements described can be practised.

In one implementation, the general purpose computer system 1200 is coupled to a camera to form a video camera on which the various arrangements described are practised. In another implementation, one instance of the general purpose computer system 1200 is an external computing device that receives data from a camera and encodes a foreground map and metadata for transmission as object data over a communications channel.

As seen in FIG. 12, the computer system 1200 is formed by a computer module 1201, input devices such as a keyboard 1202, a mouse pointer device 1203, a scanner 1226, a camera 1227, and a microphone 1280, and output devices including a printer 1215, a display device 1214 and loudspeakers 1217. An external Modulator-Demodulator (Modem) transceiver device 1216 may be used by the computer module 1201 for communicating to and from a communications network 1220 via a connection 1221. The network 1220 may be a wide-area network (WAN), such as the Internet or a private WAN. Where the connection 1221 is a telephone line, the modem 1216 may be a traditional "dial-up" modem. Alternatively, where the connection 1221 is a high capacity (e.g., cable)

connection, the modem 1216 may be a broadband modem. A wireless modem may also be used for wireless connection to the network 1220.

The computer module 1201 typically includes at least one processor unit 1205, and a memory unit 1206 for example formed from semiconductor random access memory (RAM) and semiconductor read only memory (ROM). The module 1201 also includes an number of input/output (I/O) interfaces including an audio-video interface 1207 that couples to the video display 1214, loudspeakers 1217 and microphone 1280, an I/O interface 1213 for the keyboard 1202, mouse 1203, scanner 1226, camera 1227 and optionally a joystick (not illustrated), and an interface 1208 for the external modem 1216 and printer 1215. In some implementations, the modem 1216 may be incorporated within the computer module 1201, for example within the interface 1208. The computer module 1201 also has a local network interface 1211 which, via a connection 1223, permits coupling of the computer system 1200 to a local computer network 1222, known as a Local Area Network (LAN). As also illustrated, the local network 1222 may also couple to the wide network 1220 via a connection 1224, which would typically include a so-called "firewall" device or device of similar functionality. The interface 1211 may be formed by an Ethernet™ circuit card, a Bluetooth™ wireless arrangement or an IEEE 802.11 wireless arrangement.

The interfaces 1208 and 1213 may afford either or both of serial and parallel connectivity, the former typically being implemented according to the Universal Serial Bus (USB) standards and having corresponding USB connectors (not illustrated). Storage devices 1209 are provided and typically include a hard disk drive (HDD) 1210. Other storage devices such as a floppy disk drive and a magnetic tape drive (not illustrated) may also be used. An optical disk drive 1212 is typically provided to act as a non-volatile source of data. Portable memory devices, such optical disks (e.g., CD-ROM, DVD), USB-RAM, and floppy disks, for example, may then be used as appropriate sources of data to the system 1200.

The components 1205 to 1213 of the computer module 1201 typically communicate via an interconnected bus 1204 and in a manner which results in a conventional mode of operation of the computer system 1200 known to those in the relevant art. Examples of computers on which the described arrangements can be practised include IBM-PCs and compatibles, Sun Sparcstations, Apple Mac™, or alike computer systems evolved therefrom.

The method of transmitting object data over a communications channel may be implemented using the computer system 1200, wherein the processes of FIGS. 1 to 11 may be implemented as one or more software application programs 1233 executable within the computer system 1200. In particular, the steps of the method of transmitting object data over a communications channel are effected by instructions 1231 in the software 1233 that are carried out within the computer system 1200. The software instructions 1231 may be formed as one or more code modules, each for performing one or more particular tasks. The software may also be divided into two separate parts, in which a first part and the corresponding code modules performs the encoding methods and a second part and the corresponding code modules manage a user interface between the first part and the user.

The software 1233 is generally loaded into the computer system 1200 from a computer readable medium, and is then typically stored in the HDD 1210, as illustrated in FIG. 12 or the memory 1206, after which the software 1233 can be executed by the computer system 1200. In some instances, the application programs 1323 may be supplied to the user encoded on one or more CD-ROM 1225 and read via the corresponding drive 1212 prior to storage in the memory 1210 or 1206. Alternatively the software 1233 may be read by the computer system 100 from the networks 1220 or 1222 or loaded into the computer system 1200 from other computer readable media. Computer readable storage media refers to any storage medium that participates in providing instructions and/or data to the computer system 1200 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 1201. Examples of computer readable transmission media that may also participate in the provision of software, application programs, instructions and/or data to the computer module 1201 include radio or infra-red transmission channels as well as a network connection to another computer or networked device, and the Internet or Intranets including e-mail transmissions and information recorded on Websites and the like.

The second part of the application programs 1233 and the corresponding code modules mentioned above may be executed to implement one or more graphical user interfaces (GUIs) to be rendered or otherwise represented upon the display 1214. Through manipulation of typically the keyboard 1202 and the mouse 1203, a user of the computer system 1200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1217 and user voice commands input via the microphone 1280.

FIG. 13 is a detailed schematic block diagram of the processor 1305 and a "memory" 1334. The memory 1334 represents a logical aggregation of all the memory devices (including the HDD 1210 and semiconductor memory 1206) that can be accessed by the computer module 1201 in FIG. 12.

When the computer module 1201 is initially powered up, a power-on self-test (POST) program 1350 executes. The POST program 1350 is typically stored in a ROM 1349 of the semiconductor memory 1206. A program permanently stored in a hardware device such as the ROM 1349 is sometimes referred to as firmware. The POST program 1350 examines hardware within the computer module 1201 to ensure proper functioning, and typically checks the processor 1205, the memory (1209, 1206), and a basic input-output systems software (BIOS) module 1351, also typically stored in the ROM 1349, for correct operation. Once the POST program 1350 has run successfully, the BIOS 1351 activates the hard disk drive 1210. Activation of the hard disk drive 1210 causes a bootstrap loader program 1352 that is resident on the hard disk drive 1210 to execute via the processor 1205. This loads an operating system 1353 into the RAM memory 1206 upon which the operating system 1353 commences operation. The operating system 1353 is a system level application, executable by the processor 1205, to fulfil various high level functions, including processor management, memory management, device management, storage management, software application interface, and generic user interface.

The operating system 1353 manages the memory (1209, 1206) in order to ensure that each process or application running on the computer module 1201 has sufficient memory in which to execute without colliding with memory allocated to another process. Furthermore, the different types of memory available in the system 1200 must be used properly so that each process can run effectively. Accordingly, the aggregated memory 1334 is not intended to illustrate how particular segments of memory are allocated (unless otherwise stated), but rather to provide a general view of the memory accessible by the computer system 1200 and how such is used.

The processor 1205 includes a number of functional modules including a control unit 139, an arithmetic logic unit (ALU) 1340, and a local or internal memory 1348, sometimes called a cache memory. The cache memory 1348 typically includes a number of storage registers 1344-1346 in a register section. One or more internal buses 1341 functionally interconnect these functional modules. The processor 1205 typically also has one or more interfaces 1342 for communicating with external devices via the system bus 1204, using a connection 1218.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328-1330 and 1335-1337 respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328-1329.

In general, the processor 1205 is given a set of instructions which are executed therein. The processor 1205 then waits for a subsequent input, to which the processor reacts by executing another set of instructions. Each input may be provided from one or more of a number of sources, including data generated by one or more of the input devices 1202, 1203, data received from an external source across one of the networks 1220, 1222, data retrieved from one of the storage devices 1206, 1209, or data retrieved from a storage medium 1225 inserted into the corresponding reader 1212. The execution of a set of the instructions may in some cases result in output of data. Execution may also involve storing data or variables to the memory 1334.

The disclosed classification arrangements use input variables 1354, that are stored in the memory 1334 in corresponding memory locations 1355-1358. The classification arrangements produce output variables 1361, which are stored in the memory 1334 in corresponding memory locations 1362-1365. Intermediate variables may be stored in memory locations 1359, 1360, 1366 and 1367.

The register section 1344-1346, the arithmetic logic unit (ALU) 1340, and the control unit 1339 of the processor 1205 work together to perform sequences of micro-operations needed to perform "fetch, decode, and execute" cycles for every instruction in the instruction set making up the program 1333. Each fetch, decode, and execute cycle comprises:

(a) a fetch operation, which fetches or reads an instruction 1331 from a memory location 1328;

(b) a decode operation in which the control unit 1339 determines which instruction has been fetched; and (c) an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 6 to 11 is associated with one or more segments of the program 1333, and is performed by the register section 1344-1347, the ALU 1340, and the control unit 1339 in the processor 1205 working together to perform the fetch, decode, and execute cycles for every instruction in the instruction set for the noted segments of the program 1333.

The method of transmitting object data over a communications channel may alternatively be implemented in dedicated hardware such as one or more integrated circuits performing the functions or sub functions of encoding a foreground map, encoding metadata, and transmitting the encoded foreground map and the encoded metadata. Such dedicated hardware may include graphic processors, digital signal processors, or one or more microprocessors and associated memories.

Industrial Applicability

The arrangements described are applicable to the computer and data processing industries and particularly for the imaging and security industries.

The foregoing describes only some embodiments of the present invention, and modifications and/or changes can be made thereto without departing from the scope and spirit of the invention, the embodiments being illustrative and not restrictive.

We claim:

1. A method of classifying an abnormal behavior of a detected object in a video frame, the video frame comprising a plurality of blocks and the detected object being associated with a subset of the plurality of blocks, said method comprising steps of:
   (a) associating a behavior model with each of the plurality of blocks, wherein each behavior model includes a set of behavior modes having a set of parameters;
   (b) for each block in the video frame associated with the detected object:
      (i) determining a set of behavior statistics associated with the detected object in the video frame, based on the detected object and the set of parameters;
      (ii) comparing the determined set of behavior statistics with each behavior mode in the set of behavior modes associated with that block to determine an abnormality score; and
      (iii) selecting the lowest abnormality score from the determined abnormality scores; and
   (c) classifying the abnormal behavior of the detected object based on the lowest abnormality scores associated with the subset of the plurality of blocks associated with the detected object, said classifying step comprising:
      (i) determining an average abnormality score for all blocks in the subset of blocks associated with the detected object, based on the lowest abnormality scores;
      (ii) comparing the average abnormality score with an abnormality threshold; and
      (iii) triggering an abnormality event if the average abnormality score exceeds the abnormality threshold.

2. The method according to claim 1, further comprising a step of, for each block in the subset of blocks associated with the detected object, updating the behavior model associated with the block, based on the set of behavior statistics.

3. The method according to claim 1, further comprising a step of creating a new behavior mode, substantially comprising the behavior statistics of the detected object.

4. The method according to claim 1, further comprising a step of comparing the set of behavior statistics against each behavior mode in said set of behavior modes.

5. The method according to claim 1, wherein each of the blocks is associated with a mode limit defining a maximum number of behavior modes in said set of behavior modes.

6. The method according to claim 1, wherein all of the plurality blocks are of equal size.

7. The method according to claim 1, wherein the set of parameters is selected from the group consisting of speed, object size, and object stability.

8. The method according to claim 1, wherein each of the behavior modes includes a set of object parameters, each associated with a mean and standard deviation.

9. A camera system for classifying a behavior of a detected object in a video frame, said camera system comprising:
- a lens system for focusing on a scene including the detected object;
- a camera module coupled to the lens system to store the video frame;
- an object detection module for detecting an object in the video frame, wherein the video frame comprises a plurality of blocks and the detected object is associated with a subset of the plurality of blocks;
- an object tracking module for associating parameters of a set of parameters with the detected object; and
- at least a processor and memory, cooperating to function as:
  - an association unit configured to associate a behavior model with each of the plurality of blocks, wherein each behavior model includes a set of behavior modes having the set of parameters;
  - a performance unit configured to, for each block in the video frame associated with the detected object:
    (i) determine a set of behavior statistics associated with the detected object, based on the detected object and the set of parameters;
    (ii) compare the determined set of behavior statistics with each behavior mode in the set of behavior modes associated with that block to determine an abnormality score; and
    (iii) select the lowest abnormality score from the determined abnormality scores; and
  - a classifying unit configured to classify the behavior of the detected object based on the lowest abnormality scores associated with the subset of the plurality of blocks associated with the detected object, said classifying unit comprising:
    (i) a determining unit configured to determine an average abnormality score for all blocks in the subset of blocks associated with the detected object, based on the lowest abnormality scores;
    (ii) a comparing unit configured to compare the average abnormality score with an abnormality threshold; and
    (iii) a triggering unit configured to trigger an abnormality event if the average abnormality score exceeds the abnormality threshold.

10. A non-transitory computer-readable storage medium storing an executable computer program that when executed causes a computer to perform a method of classifying a behavior of a detected object in a video frame, the video frame comprising a plurality of blocks and the detected object being associated with a subset of the plurality of blocks, said method comprising steps of:
(a) associating a behavior model with each of the plurality of blocks, wherein each behavior model includes a set of behavior modes having a set of parameters;
(b) for each block in said video frame associated with the detected object:
   (i) determining a set of behavior statistics associated with the detected object in the video frame, based on the detected object and the set of parameters;
   (ii) comparing the determined set of behavior statistics with each behavior mode in the set of behavior modes associated with that block to determine an abnormality score; and
   (iii) selecting the lowest abnormality score from the determined abnormality scores; and
(c) classifying the behavior of the detected object based on the lowest abnormality scores associated with the subset of the plurality of blocks associated with the detected object, said classifying step comprising:
   (i) determining an average abnormality score for all blocks in the subset of blocks associated with the detected object, based on the lowest abnormality scores;
   (ii) comparing the average abnormality score with an abnormality threshold; and
   (iii) triggering an abnormality event if the average abnormality score exceeds the abnormality threshold.

* * * * *